US009042263B1

(12) United States Patent
Yahalom et al.

(10) Patent No.: US 9,042,263 B1
(45) Date of Patent: May 26, 2015

(54) SYSTEMS AND METHODS FOR COMPARATIVE LOAD ANALYSIS IN STORAGE NETWORKS

(75) Inventors: Raphael Yahalom, Needham, MA (US); Assaf Levy, Brookline, MA (US)

(73) Assignee: NetApp, Inc., Sunnyvale, CA (US)

( * ) Notice: Subject to any disclaimer, the term of this patent is extended or adjusted under 35 U.S.C. 154(b) by 368 days.

(21) Appl. No.: 12/080,946

(22) Filed: Apr. 7, 2008

Related U.S. Application Data

(60) Provisional application No. 60/922,264, filed on Apr. 6, 2007.

(51) Int. Cl.
*G01R 31/08* (2006.01)
*H04L 12/54* (2013.01)

(52) U.S. Cl.
CPC .................... *H04L 12/569* (2013.01)

(58) Field of Classification Search
CPC ........................................ H04L 43/50
USPC ................................ 370/241–256
See application file for complete search history.

(56) References Cited

U.S. PATENT DOCUMENTS

| 5,043,866 | A |   | 8/1991  | Myre, Jr. et al. |         |
|-----------|---|---|---------|------------------|---------|
| 5,280,611 | A |   | 1/1994  | Mohan et al.     |         |
| 5,327,556 | A |   | 7/1994  | Mohan et al.     |         |
| 5,381,545 | A |   | 1/1995  | Baker et al.     |         |
| 5,684,967 | A | * | 11/1997 | McKenna et al.   | 715/853 |
| 5,774,337 | A |   | 6/1998  | Lee et al.       |         |
| 5,825,772 | A |   | 10/1998 | Dobbins et al.   |         |
| 5,940,819 | A |   | 8/1999  | Beavin et al.    |         |
| 6,014,673 | A |   | 1/2000  | Davis et al.     |         |
| 6,223,176 | B1 |  | 4/2001  | Ricard et al.    |         |
| 6,233,240 | B1 |  | 5/2001  | Barbas et al.    |         |
| 6,240,463 | B1 |  | 5/2001  | Benmohamed et al.|         |
| 6,327,598 | B1 |  | 12/2001 | Kelley et al.    |         |
| 6,347,335 | B1 |  | 2/2002  | Shagam et al.    |         |
| 6,434,626 | B1 |  | 8/2002  | Prakash et al.   |         |
| 6,535,517 | B1 | * | 3/2003  | Arkko et al.     | 370/401 |
| 6,636,981 | B1 |  | 10/2003 | Barnett et al.   |         |

(Continued)

FOREIGN PATENT DOCUMENTS

WO  WO-0182077 A2  11/2001
WO  WO-02088947 A2  11/2002

(Continued)

OTHER PUBLICATIONS

"Storage Management and the Continued Importance of CIM," White Paper, Data Mobility Group (Jan. 2004).

(Continued)

*Primary Examiner* — Nicholas Jensen
*Assistant Examiner* — Berhanu Belete
(74) *Attorney, Agent, or Firm* — LeClairRyan, a Professional Corporation (57) ABSTRACT

Methods and systems for collecting, analyzing, and presenting traffic loads in each part of a storage area network are described. These methods and systems account for various resource types, logical access paths, and relationships among different storage environment components. Data traffic flow is managed in terms of resource planning and consumption. The aggregated information is stored, and may be used to estimate future data traffic loads or determine deviations between projected and actual traffic load status from which adjustments may be made to better predict and manage future data traffic load.

24 Claims, 6 Drawing Sheets

(56) References Cited

U.S. PATENT DOCUMENTS

| | | | |
|---|---|---|---|
| 6,691,169 | B1 | 2/2004 | D'Souza |
| 6,751,228 | B1 | 6/2004 | Okamura |
| 6,792,503 | B2 | 9/2004 | Yagi et al. |
| 6,795,399 | B1 | 9/2004 | Benmohamed et al. |
| 6,801,949 | B1 * | 10/2004 | Bruck et al. .................. 709/232 |
| 6,816,927 | B2 | 11/2004 | Bouchet |
| 6,904,143 | B1 | 6/2005 | Peterson et al. |
| 6,909,700 | B1 | 6/2005 | Benmohamed et al. |
| 7,051,029 | B1 | 5/2006 | Fayyad et al. |
| 7,058,702 | B2 | 6/2006 | Hogan |
| 7,062,559 | B2 | 6/2006 | Yoshimura et al. |
| 7,069,480 | B1 | 6/2006 | Lovy et al. |
| 7,103,653 | B2 | 9/2006 | Iwatani |
| 7,103,712 | B2 | 9/2006 | Mizuno |
| 7,120,654 | B2 | 10/2006 | Bromley |
| 7,127,633 | B1 | 10/2006 | Olson et al. |
| 7,149,886 | B2 | 12/2006 | Fujibayashi et al. |
| 7,194,538 | B1 | 3/2007 | Rabe et al. |
| 7,216,263 | B2 * | 5/2007 | Takaoka et al. ............ 714/47.2 |
| 7,260,628 | B2 | 8/2007 | Yamamoto et al. |
| 7,376,937 | B1 | 5/2008 | Srivastava et al. |
| 7,380,239 | B1 | 5/2008 | Srivastava et al. |
| 7,512,954 | B2 | 3/2009 | Srivastava et al. |
| 7,546,333 | B2 | 6/2009 | Alon et al. |
| 7,617,320 | B2 | 11/2009 | Alon et al. |
| 7,656,812 | B2 * | 2/2010 | Tadimeti et al. ............ 370/248 |
| 2002/0145981 | A1 | 10/2002 | Klinker et al. |
| 2003/0005119 | A1 | 1/2003 | Mercier et al. |
| 2003/0018619 | A1 | 1/2003 | Bae et al. |
| 2003/0055932 | A1 | 3/2003 | Brisse |
| 2003/0131077 | A1 | 7/2003 | Hogan |
| 2003/0191992 | A1 | 10/2003 | Kaminsky et al. |
| 2003/0208589 | A1 | 11/2003 | Yamamoto |
| 2003/0237017 | A1 | 12/2003 | Jibbe |
| 2004/0019833 | A1 | 1/2004 | Riedl |
| 2004/0030768 | A1 | 2/2004 | Krishnamoorthy et al. |
| 2004/0049564 | A1 * | 3/2004 | Ng et al. ................... 709/223 |
| 2004/0075680 | A1 | 4/2004 | Grace et al. |
| 2004/0103254 | A1 * | 5/2004 | Satoyama et al. ........... 711/150 |
| 2004/0215749 | A1 | 10/2004 | Tsao |
| 2004/0243699 | A1 | 12/2004 | Koclanes et al. |
| 2005/0010682 | A1 * | 1/2005 | Amir et al. .................. 709/238 |
| 2005/0044088 | A1 | 2/2005 | Lindsay et al. |
| 2005/0055436 | A1 * | 3/2005 | Yamada et al. .............. 709/224 |
| 2005/0097471 | A1 | 5/2005 | Faraday et al. |
| 2005/0114403 | A1 | 5/2005 | Atchison |
| 2005/0160431 | A1 | 7/2005 | Srivastava et al. |
| 2005/0262233 | A1 * | 11/2005 | Alon et al. ................... 709/223 |
| 2006/0004830 | A1 | 1/2006 | Lora et al. |
| 2006/0106938 | A1 | 5/2006 | Dini et al. |
| 2006/0143492 | A1 | 6/2006 | LeDuc et al. |
| 2006/0161883 | A1 | 7/2006 | Lubrecht et al. |
| 2006/0161884 | A1 | 7/2006 | Lubrecht et al. |
| 2006/0218366 | A1 | 9/2006 | Fukuda et al. |
| 2006/0265497 | A1 * | 11/2006 | Ohata et al. .................. 709/224 |
| 2007/0050684 | A1 * | 3/2007 | Takaoka et al. ................. 714/47 |
| 2007/0088763 | A1 | 4/2007 | Yahalom et al. |
| 2007/0094378 | A1 | 4/2007 | Baldwin et al. |
| 2007/0112883 | A1 | 5/2007 | Asano et al. |
| 2007/0169177 | A1 | 7/2007 | MacKenzie et al. |
| 2007/0198722 | A1 * | 8/2007 | Kottomtharayil et al. .... 709/226 |
| 2007/0206509 | A1 * | 9/2007 | Vedanabhatla et al. ....... 370/252 |
| 2007/0294562 | A1 * | 12/2007 | Takamatsu et al. ............... 714/4 |
| 2008/0025322 | A1 * | 1/2008 | Tadimeti et al. ............. 370/400 |
| 2009/0172666 | A1 | 7/2009 | Yahalom et al. |
| 2009/0313367 | A1 | 12/2009 | Alon et al. |

FOREIGN PATENT DOCUMENTS

| | | |
|---|---|---|
| WO | WO-03054711 A1 | 7/2003 |
| WO | WO-2004111765 A2 | 12/2004 |

OTHER PUBLICATIONS

"Softek SANView: Simplify the discovery and management of multi-vendor SANs," Fujitsu Softek (May 2002).

"Information Lifecycle Management: An Automated Approach," Technical White Paper, EMC2 (Dec. 8, 2003).

"Kasten Chase Unveils Advanced Security Architecture," GRIDtoday, v.1, n. 18; www.gridtoday.com/02/101/100546.html, (Oct. 14, 2002), printed from Internet on Oct. 16, 2003.

"Assurency: Comprehensive, Persistent Security for Storage Area Networks," Kasten Chase (2002).

"Radiant Data Server Technology Overview," White Paper, Radiant Data Corporation (2003).

Lee et al., "Storage Network Management Software—The Critical Enabler of Maximum ROI," Storage Consulting Group (Dec. 16, 2002).

* cited by examiner

SYSTEMS AND METHODS FOR COMPARATIVE LOAD ANALYSIS IN STORAGE NETWORKS

CROSS-REFERENCE TO RELATED PATENT APPLICATIONS

This application claims the benefit under 35 U.S.C. §119 (e) of U.S. Provisional Application No. 60/922,264 filed Apr. 6, 2007, which is hereby incorporated herein by reference in its entirety.

FIELD OF THE INVENTION

The systems and methods generally relate to the field of data traffic load analysis in storage networks.

BACKGROUND

A SAN or storage area network, sometimes called a storage network environment, is a network dedicated to enabling multiple applications on multiple hosts to access, i.e., read and write, data stored in consolidated shared storage infrastructures. A SAN consists of SAN devices, for example, different types of switches, which are interlinked, and is based on a number of possible transfer protocols such as Fiber Channel and iSCSI. Each server is connected to a SAN with one or more network cards, for example, an HBA. Application data is stored as data objects on storage devices in storage units e.g. LUNs. The storage device may be used to store data related to the applications on the host.

Storage network environments enable applications to be executed on hosts and communicate with the storage environment components to gain read and writer access to their data objects. Thus, a storage network environment may comprise various types of components such as interconnected network components and storage device components. The storage environment may also comprise storage environment components for storing data objects (such as storage devices of different types) and for enabling read and wrote access to stored data objects (such as switches and directors of different types and other types of storage networking devices).

Enterprises are deploying increasingly large-scale SANs to gain economies-of-scale business benefits, and are performing and planning massive business-critical migration processes to these new environments. These SAN are increasingly large and complex. A typical SAN environment in a Fortune 500 company may contain hundreds or thousands of servers and tens or hundreds of switches and storage devices of different types. Furthermore these SAN environments are undergoing a large amount of change and growth.

The large size and rate of growth of SANs has led to added complexity. The number of components and links which may be associated with the data transfer from each given application and one or more of its data units may increase exponentially with the size of the SAN.

In turn, this complexity leads to difficulties in managing and configuring resources in the SAN. Compounded by the heterogeneity of the SAN devices, this complexity leads to high risk and inefficiency. The associated risk of failures in SANs is high, and the consequences of failures may be crippling. To this end, there is a significant need to tie the level of storage service provided to applications in storage environments to the amount of resources required to provide that level of service. In addition, there is a need to consider the quality levels of the individual components and the joint attributes along data flow paths, thereby allowing for better service levels as well as resource consumption.

The complexity in SANS could also lead to large imbalances in data traffic flow through the SAN. Traffic load imbalances may lead to failures in the SAN. To this end, there is a need to consider the traffic load through a given point in the storage network environment. Traffic load is the amount of data transferred through a point in the network, e.g., a given port of a given component in the network, over a specified interval of time. This interval of time may be fixed, such that the specified intervals occur periodically in time.

In a storage infrastructure environments, frequent mismatches occur between actual data traffic load and projected data traffic load. These imbalances or mismatches occur as a result of either congestion in the network environment, or a hardware, software, or configuration problem within one or more of the network components. This may be because typical data traffic monitoring approaches are too resource-specific or point-in-time oriented. Hence, these approaches cannot consider, in a time-consistent and application end-to-end fashion, the actual status of data traffic flow through in storage networks. These approaches also cannot account for the complete relationship among network applications, storage service levels, traffic load levels, and resource capacity.

Note that an access path or a logical access path will encompass a logical channel between a given application and a given data object. It may include several components, each of which must be configured appropriately for data traffic to flow through the component.

Because of the potentially very large number of components in the storage network environment, very frequent storage network environment changes, and large amount of local state information of each component, and because of the complexity of performing the correlation of the information and analysis of the end-to-end access paths and attributes, any data traffic load monitoring approach needs to be very efficient to perform the task of managing data traffic loads and resources in SANs effectively in realistic environments.

Currently, there are no adequate technological solutions to assist SAN administrators in managing data traffic load in storage environment. There are no solutions which considers the end to end service levels of applications, the end to end access paths for data flow, and the tier levels of resources and combination of resources. As such, there exists a need for systems and methods capable of providing dynamic traffic load monitoring and/or management. In particular, there is a need for a solution to the problem of efficiently managing the data traffic load through components in storage area network environments and mapping these loads to access paths and storage service levels for applications and/or hosts.

SUMMARY

The systems and methods described herein include, among other things, processes for periodically analyzing and storing the data traffic load associated with applications in a storage network environment. The systems and methods presented include collecting, analyzing, and presenting traffic loads in each part of a storage area network. These methods and systems account for various resource types, logical access paths, and relationships among different storage environment components. Data traffic flow may be managed in terms of resource planning and consumption. The aggregated information is stored, and may be used to estimate future data traffic loads or determine deviations between projected and actual traffic load status from which adjustments may be made to better predict and manage future data traffic load.

In one aspect, the invention provides methods for analyzing the data traffic loads associated with applications in a storage network environment. In one embodiment, this method includes storing a data traffic load policy, collecting current state configuration information and current data traffic flow information from sources in the network environment, correlating this information, and deriving access paths in the network environment. In a further embodiment, the method includes standardizing formats of the current state configuration information and the current data traffic flow information and reconciling conflicts in the formats, and storing the current state configuration information and the current data traffic flow information. In another embodiment, the method includes processing the collected information, computing hierarchical traffic load distributions over a pre-selected period of time, and providing notification messages about deviations between the processed information and the data traffic load policy.

In some embodiments, processing the collected information comprises comparing the current state configuration information to a previously-stored state configuration information, identifying logical access paths in the network environment, comparing the current data traffic flow information to a previously-stored data traffic flow information, validating the current data traffic flow information against the data traffic load policy, and identifying any data traffic load policy discrepancies or violations.

In other embodiments, processing the collected information comprises comparing the current state configuration information to a previously-stored state configuration information, identifying logical access paths in the network environment, comparing the current data traffic flow information to a previously-stored data traffic flow information, validating the current data traffic flow information against the data traffic load policy, and identifying any data traffic load policy discrepancies or violations.

In some embodiments, the hierarchical traffic load distributions include a computation of absolute and relative traffic loads through each port of a first network environment component over the pre-selected period of time. In certain embodiments, the hierarchical traffic load distributions over a pre-selected period of time include a computation of absolute and relative traffic loads between a first network environment component and a second network environment component in the network environment over the pre-selected period of time. In other embodiments, the hierarchical traffic load distributions over a pre-selected period of time include a computation of absolute and relative traffic loads between network environment components on a logical access path in the network environment over the pre-selected period of time. In some embodiments, the hierarchical traffic load distributions over a pre-selected period of time include a computation of absolute and relative traffic loads between a group of associated network environment components in the network environment over the pre-selected period of time.

In an embodiment, the data traffic load policy includes a description of expected absolute and relative traffic loads through each port of a first network environment component over the pre-selected period of time. In other embodiments, the data traffic load policy includes a description of expected absolute and relative traffic loads between a first network environment component and a second network environment component in the network environment over the pre-selected period of time. In certain embodiments, the data traffic load policy includes a description of expected absolute and relative traffic loads between network environment components on a logical access path in the network environment over the pre-selected period of time. In other embodiments, the data traffic load policy includes a description of expected absolute and relative traffic loads between a group of associated network environment components in the network environment over the pre-selected period of time.

In some embodiments, collecting the current data traffic flow information includes computing for each access path the total amount of data traffic load associated with the access path. In other embodiments, collecting the current data traffic flow information includes collecting information about all the data traffic loads for each host application in the network environment.

In an embodiment, the deviations between the processed information and the data traffic load policy include the computation of a traffic load associated with a network component that exceeds a first pre-selected threshold. In another embodiment, the deviations between the processed information and the data traffic load policy include the computation of a variance between traffic loads based on the hierarchical traffic load distributions that exceeds a second pre-selected threshold. In certain embodiments, the deviations between the processed information and the data traffic load policy include a computation of a traffic load associated with a logical access path that exceeds a third pre-selected threshold, or the discovery of a zero traffic load associated with a logical access path.

In another aspect, the invention relates to a system for periodically analyzing the data traffic loads associated with applications in a storage network environment. In an embodiment, the system includes one or more hosts, one or more switches in communication with the hosts, one or more data storage devices in communication with the hosts, a user interface, a display, a memory for storing computer executable instructions; and a processor in communication with the user interface, the hosts, and the data storage devices. In some embodiments, the processor is configured to receive a user input, store a user-defined data traffic load policy, collect current state configuration information and current data traffic flow information from sources in the network environment, correlate the information and derive access paths in the network environment, standardize formats of the current state configuration information and the current data traffic flow information and reconcile conflicts, store the current state configuration information and the current data traffic flow information, process the collected information to compute hierarchical traffic load distributions over a pre-selected period of time, display different views and capabilities of the computed hierarchical traffic load distributions, and display notification messages about deviations between the processed information and the data traffic load policy on the display.

In an embodiment, the processor collects information comparing the current state configuration information to a previously-stored state configuration information, identifying logical access paths in the network environment, comparing the current data traffic flow information to a previously-stored data traffic flow information, validating the current data traffic flow information against the data traffic load policy, and identifying any data traffic load policy discrepancies or violations.

In another embodiment, the processor computes hierarchical traffic load distributions over a pre-selected period of time including absolute and relative traffic loads through each port of a first network environment component over the pre-selected period of time. In a further embodiment, the processor computes hierarchical traffic load distributions over a pre-selected period of time including absolute and relative traffic loads between a first network environment component and a second network environment component in the network environment over the pre-selected period of time. In another embodiment, the processor computes hierarchical traffic load distributions over a pre-selected period of time including absolute and relative traffic loads between network environment components on a logical access path in the network environment over the pre-selected period of time. In certain embodiments, the processor computes hierarchical traffic load distributions over a pre-selected period of time including absolute and relative traffic loads between a group of associated network environment components in the network environment over the pre-selected period of time.

In an embodiment, the processor computes for each access path the total amount of data traffic load associated with the access path. In a further embodiment, the processor collects information about all the data traffic loads for each host application in the network environment. In an embodiment, the user defines the pre-selected thresholds in the stored data traffic load policy.

In certain embodiments, the different views and capabilities of the computed hierarchical traffic load distributions include displaying traffic load information grouped by component connectivity, displaying traffic load information grouped by the associated logical access path, displaying traffic load information as they correlate to communication errors in the network, displaying traffic load information network environment components, displaying notification messages, displaying correlation information, displaying traffic load information on different time scales, and displaying traffic load summary information.

BRIEF DESCRIPTION OF THE DRAWINGS

The above and other aspects and advantages of the embodiments will be apparent upon consideration of the following detailed description, taken in conjunction with the accompanying drawings, in which like reference characters refer to like parts throughout, which may not be drawn to scale, and in which.

DETAILED DESCRIPTION OF ILLUSTRATIVE EMBODIMENTS

The systems and methods, in various embodiments, provide, among other things, processes for data traffic load management. Although the invention is described below with reference to a Storage Area Network (SAN), the description does not limit the invention, and the various embodiments set out below and depicted in the figures are merely provided for the purposes of illustrating certain embodiments of these systems and methods and for describing examples of such systems and methods. It will be apparent to those of skill in the art that the systems and methods described herein may, in certain forms, be employed in other types of storage infrastructure environments or any other networks for which access paths are defined and monitored. Thus, the scope of the invention is at least the scope defined by the appended claims and equivalents.

Figure 1:
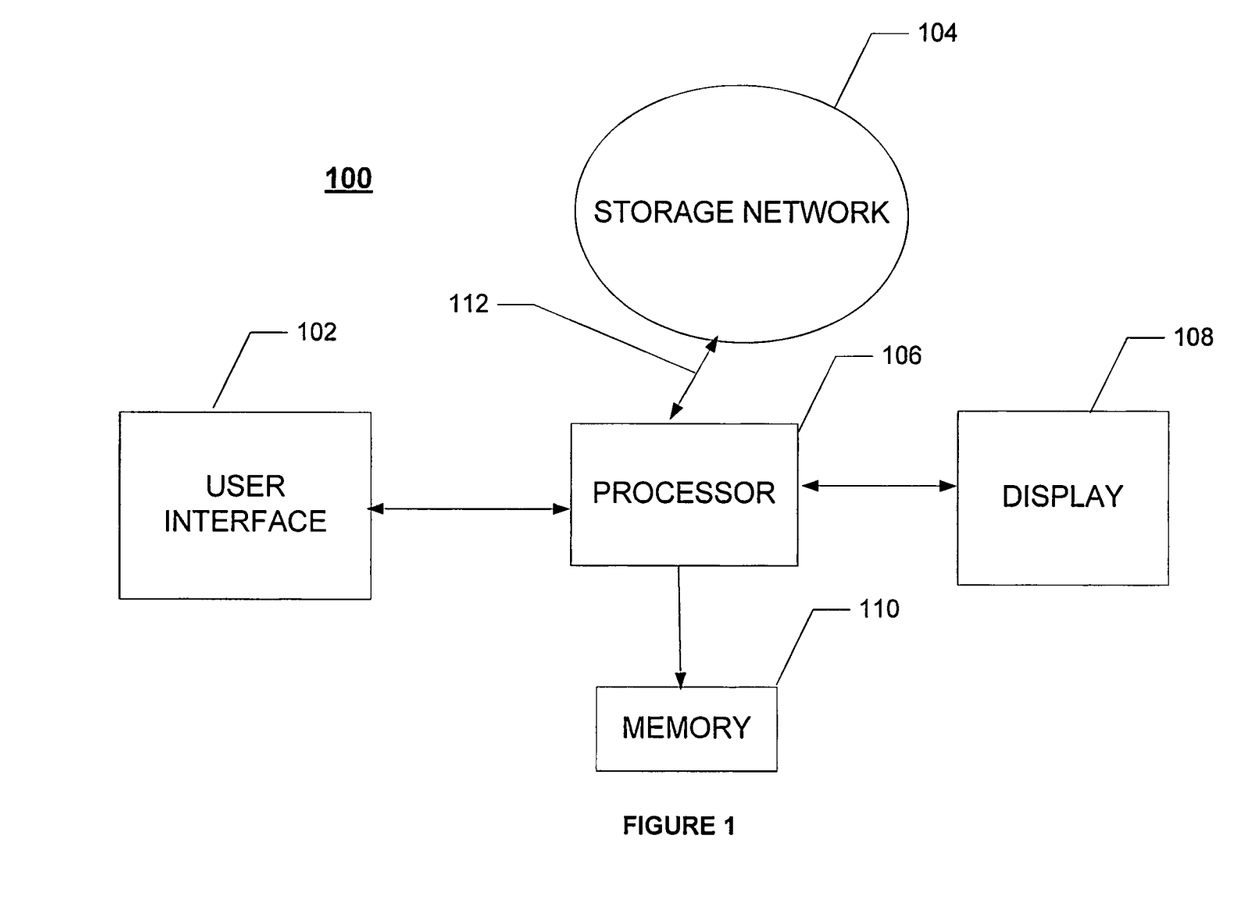
FIG. 1 shows a block diagram of a system for analyzing the data traffic loads in a storage area network in which the present invention's teachings may be implemented.

FIG. 1 shows a block diagram of a system 100 for analyzing the data traffic loads in a storage network infrastructure according to an illustrative embodiment of the invention. System 100 includes a processor 106, a display 108, a memory 110, e.g., Random-Access Memory (RAM), a user interface 102, and a storage network infrastructure 104. Processor 106 operates on information received from components in the storage network infrastructure 104 in accordance with executable instructions loaded into memory 110. The instructions will ordinarily have been loaded into the memory from local persistent storage in the form of, e.g., a disc drive with which the memory communicates. The instructions may additionally or instead be received by way of user interface 102.

System 100 displays the processed information on display 108. Display 108 may be any display device capable of interfacing with processor 106, e.g., an LCD display or a CRT monitor. One or more human users may interact with display 108 via user interface 102. For instance, system 100 could receive user input via user interface 102 from devices such as a mouse and a keyboard. The user input could also originate from devices connected to user interface 102 remotely, e.g., via a network connection.

Figure 4:
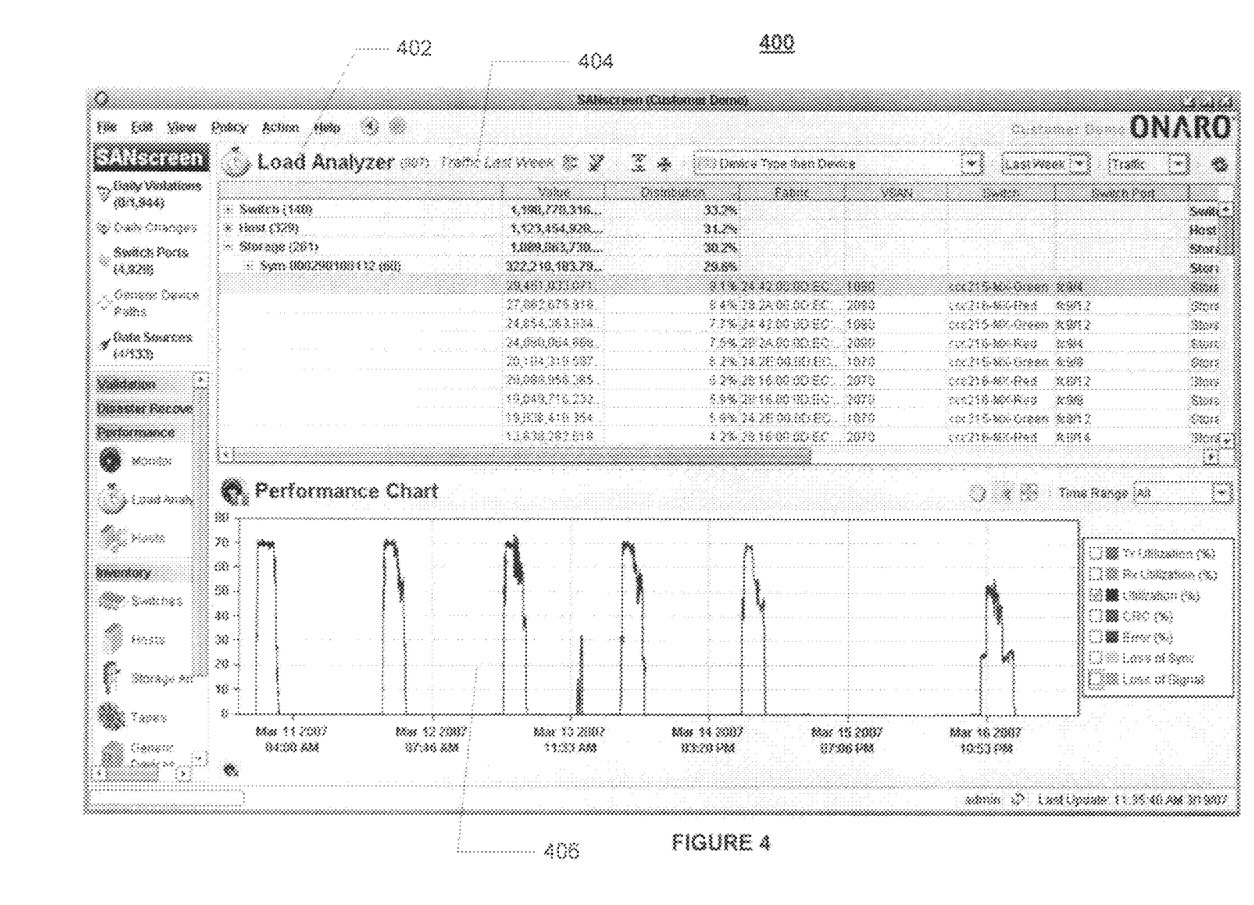
FIG. 4 is an exemplary display of data traffic loads across storage devices in the storage area network according to an illustrative embodiment of the invention.

System 100 can be used to implement a method for analyzing data traffic loads associated with applications in a storage network. Data traffic or data traffic load is the amount of data transferred through a point in the network, e.g., a given port of a given component in the network, over a specified interval of time, as will be described in reference to FIGS. 4, 5, and 6. This interval of time may be fixed, such that the specified intervals occur periodically in time, as will be described in reference to FIGS. 4, 5, and 6. A user interacting with system 100 could specify this interval of time. Absolute traffic load refers to the total data transfer through a point in the network, while relative traffic load refers to a first traffic load at a point in the network relative to a second traffic load. For instance, as will be described later, FIG. 4 shows that 322,210,183.79 bytes of data flowed through Storage Disk Sym-000290100112 in the last week. This number represents an absolute traffic load. FIG. 4 also shows that 29.6% of data traffic flow in the storage network went through Storage Disk Sym-000290100112. This number represents a relative traffic load.

Processor 106 in system 100 is configured to operate on information 112 from the storage network 104. In particular, processor 106 is configured to communicate with storage network 104 to identify logical access paths in the storage network infrastructure 104, as will be described below in reference to FIG. 2. Processor 106 is configure to communicate with storage network infrastructure 104 to collect and store current state configuration information and current data traffic flow information from sources in the network. Processor 106 is also configured communicate with storage network infrastructure 104 to compute absolute and relative traffic loads associated with logical access paths in the storage network infrastructure 104 over the user-specified interval of time using the current state configuration information. Processor 106 may receive and store expected absolute and relative traffic loads associated with logical access paths in the storage network infrastructure 104. Processor 106 is also configured to display notification messages on display 108 of system 100 based on whether these absolute or relative traffic loads are within a pre-selected threshold or range. Processor 106 carries out this operation by comparing the absolute and relative data traffic loads to the expected absolute and relative data traffic loads. A user interacting with user interface 102 may select this threshold or range, as will be described further in reference to FIGS. 4, 5, and 6.

Figure 2:
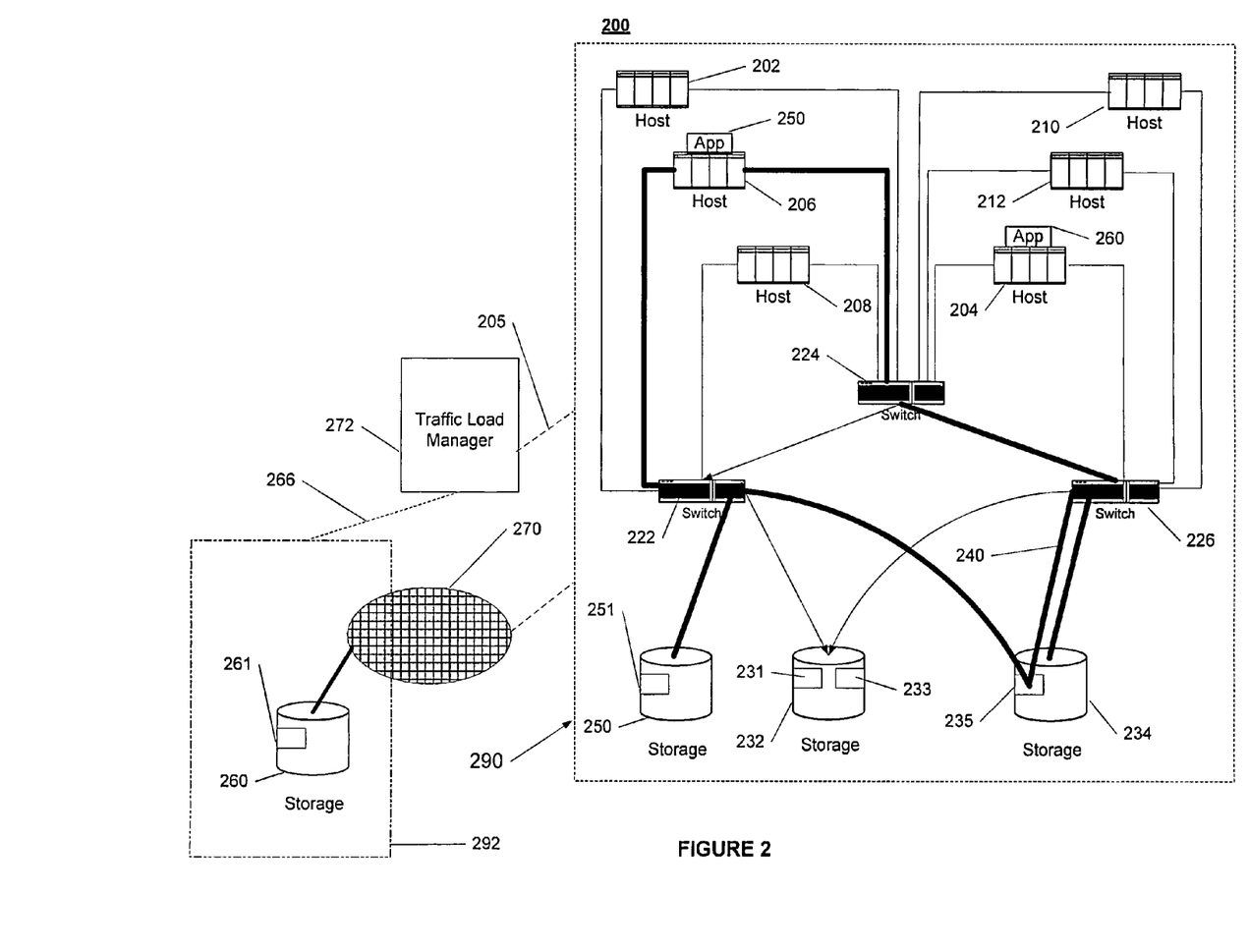
FIG. 2 shows a topological view of an exemplary storage area network infrastructure, according to an illustrative embodiment of the invention.

FIG. 2 shows a topological view of an exemplary SAN 200, according to an illustrative embodiment of the invention. Such a SAN is an example of the storage network infrastructure 104 in FIG. 1, and thus, it could be in communication with processor 106 of system 100 in FIG. 1. As shown, SAN 200 includes hosts (such as 202, 204, 206, 208, 210 and 212) switches (such as 222, 224 and 226) and data storage devices (such as 232, 234, and 250). The storage devices may be, for example, disk drives, such as RAID devices, tape drives, or other types of mass-storage devices. Storage devices may contains data objects such as volumes (e.g. 231, 233 and 235) which are stored on the storage devices. Applications execute on hosts, for example application 250 on host 206, and require read and write access to certain volumes on storage devices. SAN 200 could include multiple segments, e.g., segments 292 and 270.

SAN 200 in FIG. 2 also includes an external traffic load manager 272 which interacts with the storage infrastructure components and performs analysis and management tasks. Traffic load manager 272 may be in periodic communication with processor 106 of system 100 in FIG. 1. For instance, traffic load manager 272 may communicate periodically with each SAN component to obtain the current state configuration of the component and the characteristics of the data traffic that traversed through that component since the last periodic query, e.g., the amount of data transferred, on which ports, etc.

Each SAN component in SAN 200 has a certain type which defines its category (e.g. disk storage device, tape storage device, etc), its manufacturer (e.g. vendor name, such as EMC, IBM, Netapp, etc), its product name (e.g. Symmetrics, Clarion, Shark, etc)., and its model (e.g. its version, add-ons, etc).

Each storage network component in SAN 200 also has an internal state. The internal state of each storage network environment component at each point of time contains values for various execution state variables (such as for example amount of data that flowed through a certain port in a recent interval, or the data stored at a particular location) as well as configuration state variables (such as which ports are enabled, which other component is connected via each ports, what are the set transfer rates, which zones are defined, which are the members of each zone, etc). Changes to execution state variables occur as a result of data flow related activities, whereas changes to the configuration state variables occur as a result of planned or unplanned configuration actions.

Each storage network component in SAN 200 may have multiple attributes associated with it, that characterize various aspects of the functionality of that component. For example the attributes of a switch may include among others the maximum number of ports, the maximum data transfer rates, etc. The attributes of a storage device component may include among others the maximum capacity, the maximum rate of data reads or writes, the RAID level, etc. The value of some of these attributes can be obtained by querying the component directly, whereas the value of other values can be deduced from the component type (that is from the information about manufacturer, product, model, etc.).

An access path or a logical access path in the SAN 200 encompasses a logical channel between a given application and a given data object, e.g. LUN, along which data may flow. In other words, a logical access path is typically, although not exclusively, a sequence of components starting with a specific application on a specific server via, for example, an HBA, and a sequence of one or more switches and physical links leading to a storage controller and a storage device containing a data object e.g. a LUN. The logical or configuration state of each component along the way in that sequence, for example, the HBA, the storage controller, or the switches, is set such as to not disable data flow between that specific application and that specific data object along that specific sequence.

Access paths in SAN 200 and their related access characteristics actually need to be realized by setting up multiple underlying devices of different types. These underlying operations include multiple physical and logical basic set up actions which need to be set up in different locations and device types and with mutual consistency. Nonetheless, the end-points in SAN flows generally have a relatively strong exclusive access relationship. That is, each application on a SAN-connected host typically requires access, and often exclusive access, only to some specific SAN data objects (LUNs). Consequently, in storage area networks each source end point, i.e., the application on a host, will typically need to interact only, and often exclusively, with a specific, small number of target end points, e.g., the LUNs on the network storage devices.

In preferred embodiments, the sequence of components between an application on a host and one of its data objects stored on a storage device, their types, attributes, state set up, and connectivity between them determine the level of storage service provided to that application. That level of service includes, for example, aspects of performance and availability for data flow. An access path between an application on a host and a data object on a storage device may be a sequence of components as described above which are set to enable information flow between the application flow on the host and the data object on the storage device. Attributes associated with each such end-to-end access path determine the level of storage service provided to that application.

Part of the internal; configuration state of each component in SAN 200 contains information about the allocation of each resource, or set of resources, of that component for the exclusive use of one or more external entities, such as an application, a set of applications, other components, etc.

Resources of a components in SAN 200 which are not allocated are considered available. Allocated resources at a component can be de-allocated and the internal configuration state updated accordingly, and afterwards they can be allocated again to particular applications or components.

A resource is allocated to an access path in SAN 200 if it is allocated either to an application or to a component which is part of that access path. A resource is associated with an application if it is allocated to that application or to a component on an access path associated with that application.

For instance, in the exemplary embodiment in FIG. 2, with appropriate state configurations on storage environment components 224, 226, and 234, these components may form an access path between application 250 on host 206 and its volume 235 on data storage device 234. Volumes 251 is a local replica of volume 235 and volume 261 is a remote replica of volume 251, and so both of these are replica extensions of the access path between application 250 and volume 235.

To discover all the access paths in the storage network 200, compute their end-to-end attributes, and establish that they are consistent with the set policy requirements, information needs to be obtained from the different components regarding the types, state, and connectivity. These aspects, among others, are described in commonly-assigned U.S. patent application Ser. Nos. 10/693,632, 11/529,748, 12/006,125 and 11/965,392, the contents of which are hereby incorporated herein in their entirety.

In certain embodiments, the information on end-to-end attributes of access paths in SAN 200 is correlated and analyzed by mapping to an abstract graph-model representation in which each node represents a component and links between nodes represent connectivity between components and internal or configuration state information in each component. Data flow between two nodes in the graph is deemed possible if and only if there exists an access path between the two nodes in the model representation, and the attributes of that data flow are determined by the attributes of the different nodes and links associated with that path. If an access path exists between two nodes in the graph, or, if it is desired that an access path exist between two nodes in a graph, these two nodes may be called end nodes. Thus, logical access paths may be derived or identified in this manner and an abstract graph representation of the SAN may be constructed. The connection and configuration state information from each of the devices may be used in an aggregated process to generate an abstract graph representation of the network representing the logical access paths in the SAN.

For instance, each SAN device in SAN 200 may be represented as a node in the graph. End-nodes represent applications/servers (source end-points) and storage/data objects e.g. Volumes or LUNs (target end-points). In the first part of the abstract graph construction each edge between nodes represents an existing physical link between the SAN devices (or between a SAN device and a SAN end-points). In the next part of the constructions edges are eliminated in each case of a logical constraint, as defined in a device configuration, which disable flows on that link. The result of this iterative construction is an abstraction in which a logical access path between one application on a server and a data object e.g. Volume or LUN on a storage device exists if and only if a path exist in the abstract graph between the corresponding end nodes. An intermediate node is a node that is connected to two or more end nodes.

For the sake of process efficiency, for SAN 200 the iterative step of graph edge elimination or pruning based on logical constraints implied by device configuration set-up is performed in a order designed to achieve as much pruning as early as possible. For that purpose SAN semantics are utilized to determine the order in which device constraints are considered. For example, a LUN masking constraints on one device which constraints most of the potential data traffic flows along the physical paths, may be used to prune the graph before a zoning constraint on another which restricts a smaller number of data traffic flows.

Access path attributes for the access paths in SAN 200 may be computed for each of the existing logical access paths. The attribute values include, inter alia: level of end-to-end redundancy; type of redundancy; number of hops; and number of allocated ports.

System 100 of FIG. 1 may interact with traffic load manager 272 to perform data traffic load analysis and management tasks. For instance, traffic load manager 272 may be in communication with processor 106 of system 100 in FIG. 1, and may provide information about various aspects of the SAN 200 to the system 100. For instance, traffic load manager 272 may provide information on the data traffic flows associated with the logical access paths in SAN 200 to system 100 of FIG. 1.

Specifically, system 100 of FIG. 1 can interact with traffic load manager 272 of FIG. 2 to collect and store information from the different SAN components and detect and resolve any inconsistencies in the stored information. In this respect, traffic load manager 272 of FIG. 2 creates and stores a global snapshot consistent with respect to a particular point in time, which includes the current state configuration of all components in SAN 200, the connectivity of all SAN components and component ports, the existing logical access paths in SAN 200, and the traffic loads on each port of each component in SAN 200 over a specified time interval. This information is stored in a database in memory, e.g., in memory 110 of system 100 in FIG. 1. This historical database of collected and processed information is then used for data traffic load analysis.

Figure 3:
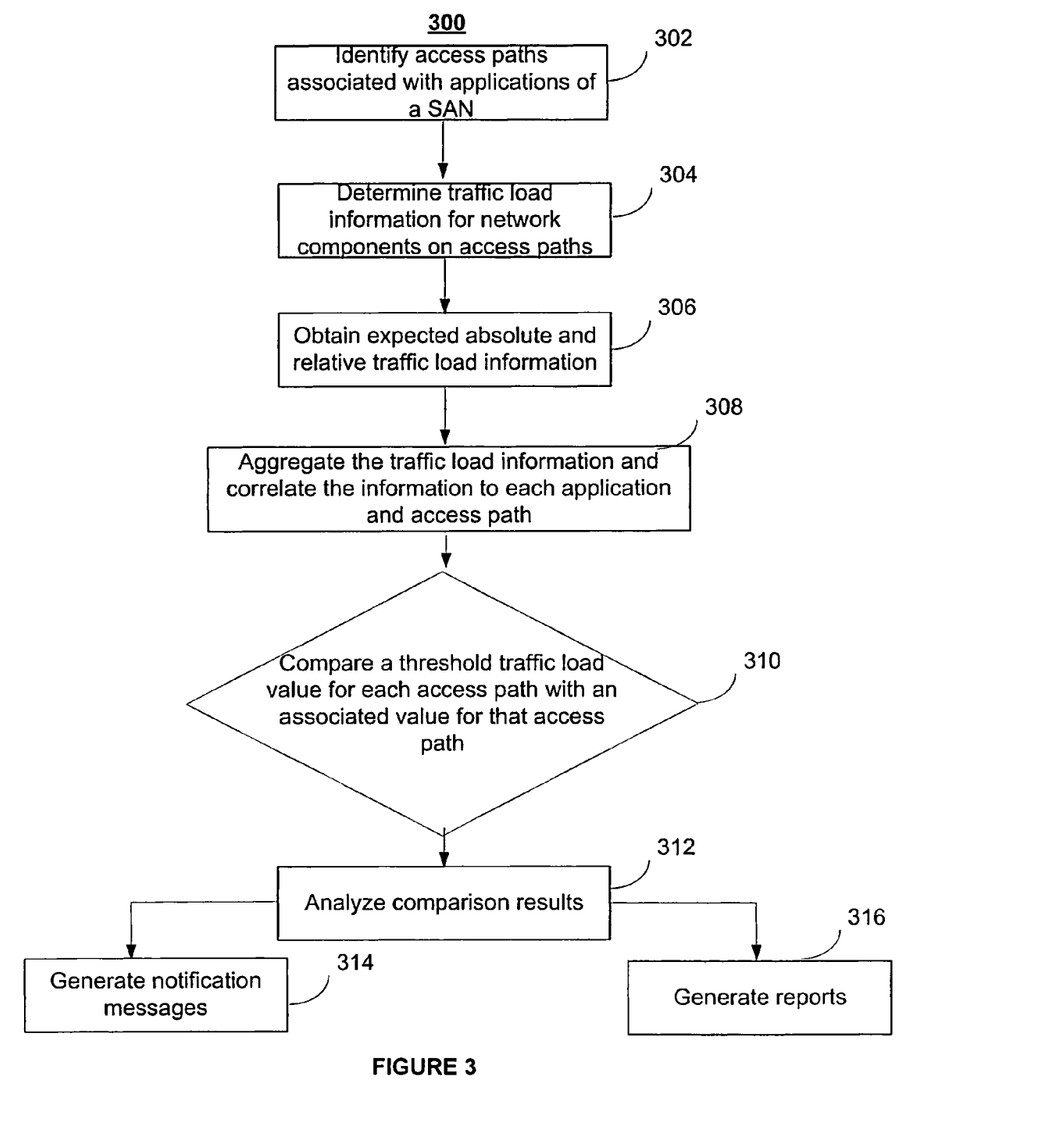
FIG. 3 shows a process flow for analyzing the data traffic loads associated with applications in a storage network environment according to an illustrative embodiment of the invention.

FIG. 3 depicts a process 300 for analyzing data traffic flows in the exemplary storage area network 200 of FIG. 2. Processor 106 of system 100 may be configured to communicate with traffic load manager to 272 in SAN 200 of FIG. 2 to carry out process 300 depicted in FIG. 3. Process 300 includes steps 302, 204, 306, 308, 310, 312, 314, and 316.

System 100 of FIG. 1 could interact with traffic load manager 272 of FIG. 2 to carry out step 302 of process 300, namely to identify the logical access paths associated with application in the storage network 200 of FIG. 2. These logical access paths could be obtained using the abstract graph constructions methods described above.

Figure 5:
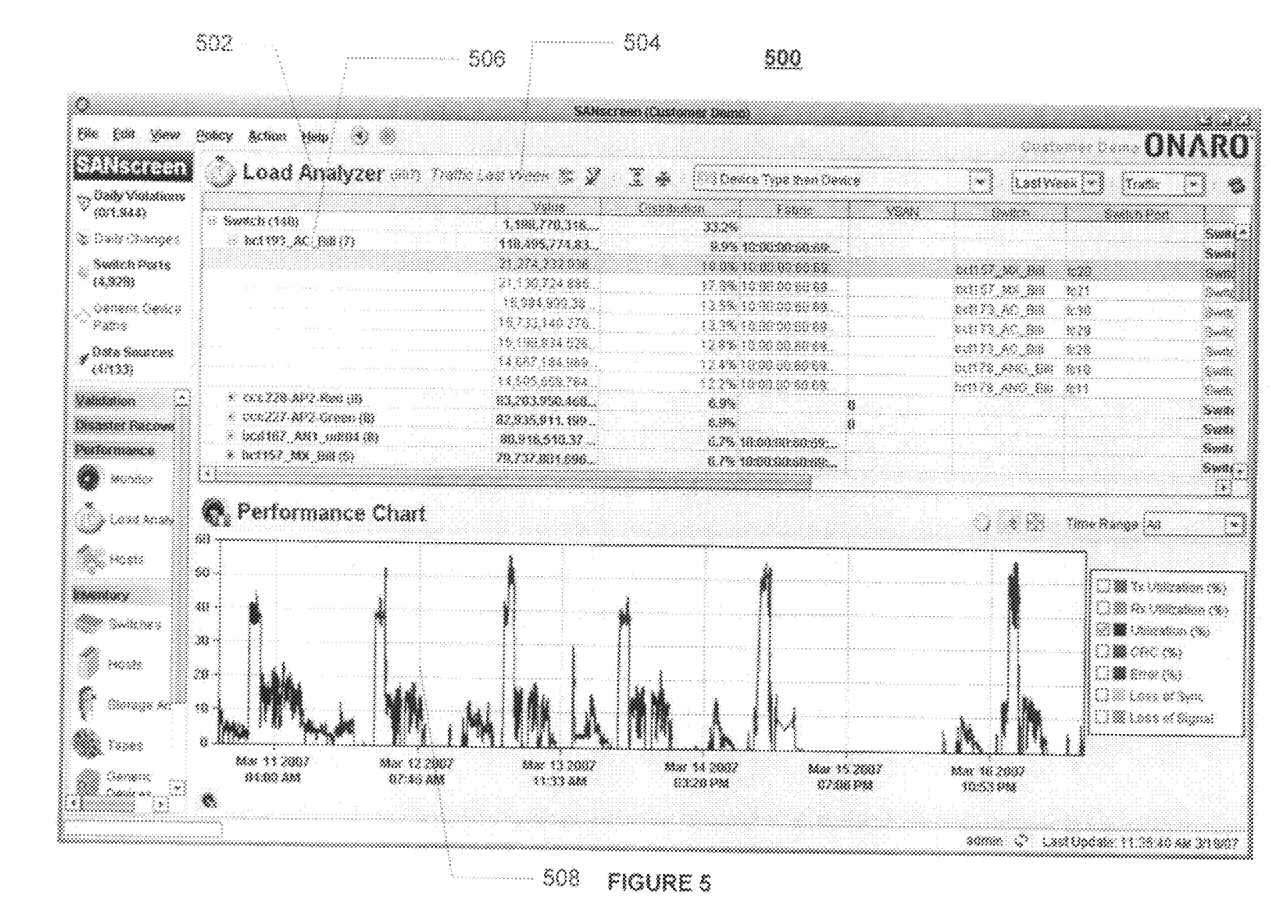
FIG. 5 is an exemplary display of data traffic loads across switches in the storage area network according to an illustrative embodiment of the invention.

Once the logical access paths have been identified in step 302, system 100 of FIG. 1 could interact with traffic load manager 272 of FIG. 2 to carry out step 304 of process 300, namely to obtain and store traffic load information for network components associated with the identified access paths. This information could include absolute and relative traffic loads between network environment components on logical access paths in the network over a pre-selected period of time. This information could include absolute and relative traffic loads through each port of a first network component over the pre-selected period of time. For instance, as will be described later, FIG. 4 shows that 322,210,183.79 bytes of data flowed through Storage Disk Sym-000290100112 in the last week. This number represents an absolute traffic load. FIG. 4 also shows that 29.6% of data traffic flow in the storage network went through Storage Disk Sym-000290100112. This number represents a relative traffic load. The information on traffic loads could also include absolute and relative traffic loads through a group of associated components in the network over a pre-selected period of time. For instance, as will be described below, FIG. 5 shows that 118,495,774.83 bytes of data transferred through a group of seven components associated with Switch bct193_AC_Bill. The information on traffic loads in the network could also include absolute and relative traffic loads between two network components over the pre-selected period of time. The pre-selected period of time may be selected by a user interacting with user interface 102 of system 100 in FIG. 1. For instance, in each of FIGS. 4, 5, and 6, this pre-selected period is one week. The computations involved in this step may be performed by processor 106 of system 100 in FIG. 1.

Step 306 in process 300 of FIG. 3 involves storing expected absolute and relative network traffic loads corresponding to those stored in step 304 above. Once again, processor 106 of system 100 of FIG. 1 could interact with traffic load manager 272 of FIG. 2 to carry out this step. The expected absolute and relative traffic loads corresponding to step 304 could be entered by a user interacting with user interface 102 of system 100 in FIG. 1. A user could enter and update information such as expected traffic loads, acceptable ranges or thresholds for these traffic loads, and group associations of sets of components, e.g., the switches in a given network fabric in SAN 200 could be grouped together.

Once step 306 has been completed, system 100 of FIG. 1 could interact with traffic load manager 272 of FIG. 2 to carry out steps 308 and 310 of process 300, namely to aggregate the computed traffic load information and to compare the expected and computed absolute and relative traffic loads obtained in steps 304 and 306 of process 300. For instance, the expected absolute and relative traffic loads associated with an access path in SAN 200 of FIG. 2 could be compared to the current absolute and relative traffic loads associated with this access path. A pre-selected threshold or range may be used for this comparison. The pre-selected threshold or range may be selected by a user interacting with user interface 102 of system 100 in FIG. 1.

Steps 312, 314, and 316 in process 300 of FIG. 3 involve analyzing the comparisons from step 310 of process 200 and generating notification messages and reports if there is a deviation or discrepancy between the expected and the computed absolute and relative traffic loads. Once again, processor 106 of system 100 of FIG. 1 could interact with traffic load manager 272 of FIG. 2 to carry out this step. For instance, processor 106 of system 100 of FIG. 1 can interact with traffic load manager 272 of FIG. 2 to analyze traffic flows by detecting deviations between the data traffic flow configuration of a logical access path and the stored traffic flow information. In this case, traffic load manager 272 would detect instances in which a logical access path is configured for a particular data traffic flow and the associated components and resources are associated with this logical access path, but no data traffic flows through that logical access path during a specified interval of time. In addition, traffic load manager 272 of FIG. 2 could interact with processor 106 of system 100 in FIG. 1 to provide notification message if, for example, the absolute traffic load associated with an access path falls outside of the pre-selected range.

System 100 of FIG. 1 could also display a notification message if any traffic load deviates relative to the expected traffic load, including: specific traffic loads that exceed (from above or below) a pre-selected range, variance between traffic loads on logical access paths which fall outside of a per-selected range, access paths and allocated resources with no corresponding traffic loads, etc. These notification messages enable further determination of the characteristics and the root cause of traffic load imbalances and are advantageous because they enable quick corrective action where required.

Processor 106 of system 100 in FIG. 1 could display the notification messages generated in step 314, and the reports generated in step 316, on display 108 of system 100 in FIG. 1. Processor 106 could provide several different views and browsing capabilities of the data traffic load information on display 108 of system 100 in FIG. 1. For instance, a user interacting with user interface 102 of system 100 in FIG. 1 could view the analyzed data traffic flows by traversing between components based on their connectivity, the access paths associated with these components, or the groups of other components associated with these components. In addition, a user could view the analyzed data traffic flows by observing the correlation between the amount of data throughput associated with a logical access path over a specified interval of time to the communication errors in the data traffic flows associated with that access path over the same interval of time. Users interacting with system 100 of FIG. 1 could also zoom in and out of traffic load summary information, where this information could include traffic loads to and from logical access paths, network components, or groups of network components. Furthermore, a user interacting with system 100 of FIG. 1 could also view each of these pieces of traffic load information on varying time intervals, e.g., a week, or a day, or a few hours, or a few minutes.

Figure 6:
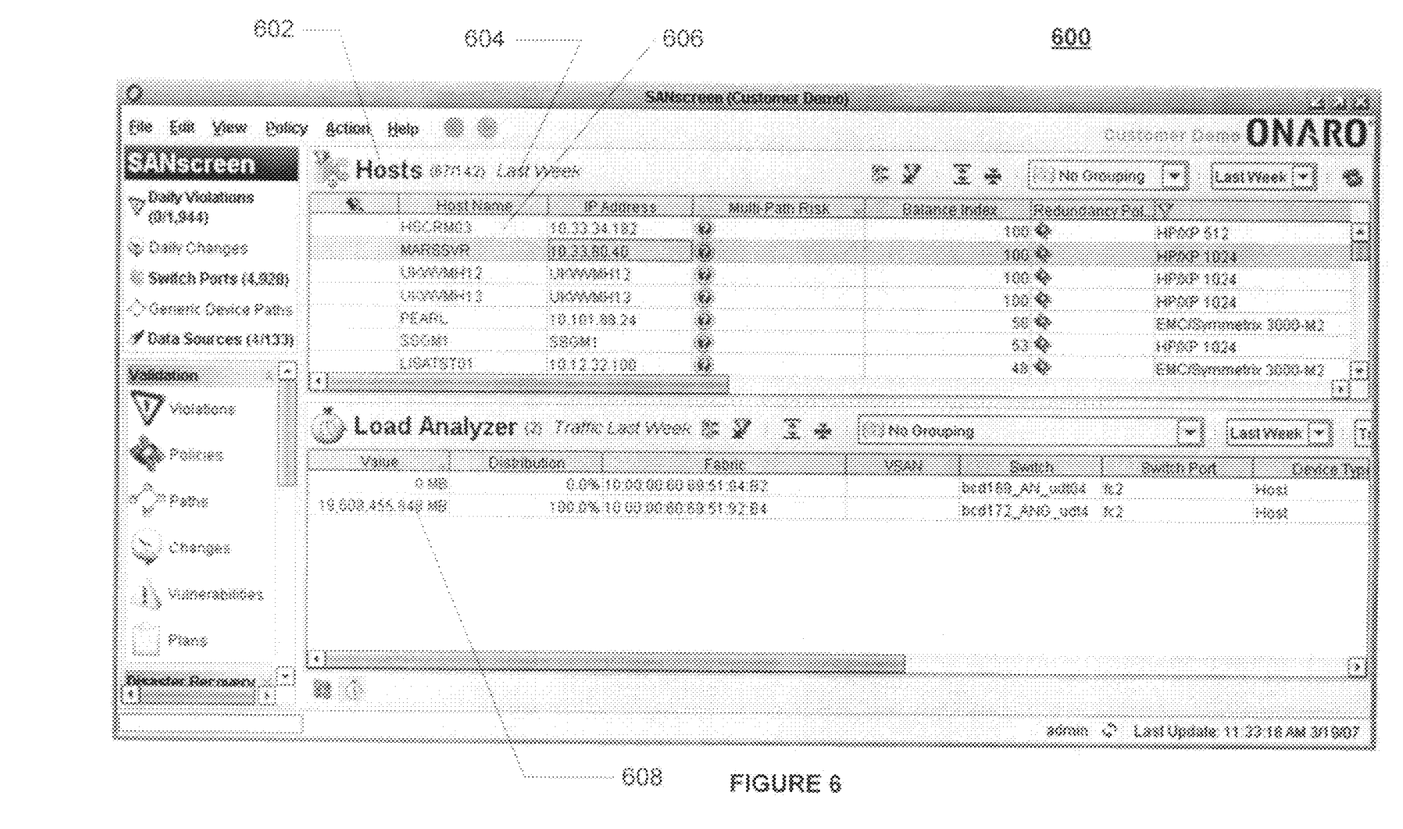
FIG. 6 is an exemplary display of notification messages regarding violations of data traffic load policy in the storage area network according to an illustrative embodiment of the invention.

FIGS. 4, 5, and 6 show different views of analyzed traffic load information that could be displayed on display 108 of system 100 in FIG. 1.

FIG. 4 shows window 400 which includes traffic load information displayed by a load analyzer module 402 over a period of the last week 404. The traffic load information is viewed in groups of SAN storage devices. This information is also displayed on a chart 406. Window 400 could be viewed on display 108 of system 100 in FIG. 1. Window 400 could present information on data traffic flow in the SAN 200. For instance, FIG. 4 shows that 322,210,183.79 bytes of data flowed through Storage Disk Sym-000290100112 in the last week. The drop-down menus on the top right corner of Window 400 could be used to view traffic loads by groups of components, individual components, or by logical access path. These menus could also be used to select the time period over which the user is analyzing the traffic loads, e.g., last week.

FIG. 5 shows window 500 which includes traffic load information displayed by a load analyzer module 502 over a period of the last week 504. The traffic load information is viewed as grouped by SAN switches 506. This information is also displayed on a chart 508. Window 500 could be viewed on display 108 of system 100 in FIG. 1. Window 500 could present information on data traffic flow in the SAN 200. For instance, Window 500 shows a display in which 118,495,774.83 bytes of data transferred through a group of seven components associated with Switch bct193_AC_Bill. The drop-down menus on the top right corner of Window 500 could be used to view traffic loads by groups of components, individual components, or by logical access path. These menus could also be used to select the time period over which the user is analyzing the traffic loads, e.g., last week.

FIG. 6 shows window 600 which includes traffic load information displayed by a load analyzer module 602 over a period of the last week 604. The traffic load information is viewed as grouped by SAN hosts 606. This information is also displayed on a spreadsheet 608. Window 600 could be viewed on display 108 of system 100 in FIG. 1. Window 600 could present information on data traffic flow in the SAN 200. The drop-down menus on the top right corner of Window 600 could be used to view traffic loads by groups of components, individual components, or by logical access path. These menus could also be used to select the time period over which the user is analyzing the traffic loads, e.g., last week.

While the invention has been disclosed in connection with the embodiments shown and described in detail, various modifications and improvements may be made thereto without departing from the spirit and scope of the invention. By way of example, although the illustrative embodiments are depicted with reference to a storage area network (SAN), this need not be the case. The principles of the invention can also be applied in a similar way to additional types of networks and infrastructures. For example, a similar analysis can be applied to storage arrays or network in which there is replicated data. Instead, other storage infrastructures with defined access paths may employ the method of the invention, and the network fabric may include any type of device that provides the described connectivity between storage environment components. Accordingly, the spirit and scope of the present invention is to be limited only by the following claims.

What is claimed is:

1. A method for analyzing data traffic loads associated with applications in a storage network, comprising:

identifying, by a storage management computing device, a plurality of logical access paths propagating data between a first end node and a second end node in a network;

computing, by the storage management computing device, absolute data traffic load comprising total data traffic load between the first end node and the second end node and relative data traffic load comprising data traffic load between the first end node and the second end node relative to total data traffic load in the network, wherein the absolute data traffic load and the relative data traffic load are based on current state configuration information and current data traffic flow information of the identified plurality of logical access paths in the network over a pre-selected period of time;

comparing, by the storage management computing device, the computed absolute data traffic load and the computed relative data traffic load over the pre-selected period of time to an expected absolute data traffic load and an expected relative data traffic load for each of the identified plurality of logical access paths in the network;

detecting, by the storage management computing device, when at least one of the computed absolute data traffic load and the computed relative data traffic load comprising a data traffic load relative to a total data traffic load, associated with a particular logical access path deviates from the corresponding expected absolute data traffic load or the expected relative data traffic load by at least one pre-selected range, wherein the particular logical access path has no data flow during the at least one pre-selected period of time; and providing, by the storage management computing device, a notification message when a variance of the computed absolute data traffic load and the computed relative data traffic load associated with the identified plurality of logical access paths deviates from the corresponding expected data traffic loads by the at least one pre-selected range.

2. The method of claim 1, further comprising: standardizing, by the storage management computing device, formats of the current state configuration information, the current data traffic flow information, and reconciling conflicts.

3. The method of claim 1, further comprising:

computing, by the storage management computing device, the absolute data traffic load and the relative data traffic load through each port of a first network component over a second pre-selected period of time;

comparing, by the storage management computing device, the computed absolute data traffic load and the computed relative data traffic load over the second pre-selected period of time to an expected absolute data traffic load and an expected relative data traffic load through each port of the first network component;

detecting, by the storage management computing device, when at least one of the computed absolute data traffic load or the computed relative data traffic load over the second pre-selected period of time deviates from the corresponding expected absolute data traffic load or the expected relative data traffic load by a second pre-selected range; and providing, by the storage management computing device, a notification message of the detected deviation by the second pre-selected range.

4. The method of claim 1, further comprising:

computing, by the storage management computing device, an absolute data traffic load and a relative data traffic load between the first network component and the second network component in the network over a third pre-selected period of time;

comparing, by the storage management computing device, the computed absolute data traffic load and the computed relative data traffic load over the third pre-selected period of time to an expected absolute data traffic load and an expected relative data traffic load between the first network component and the second network component;

detecting, by the storage management computing device, when at least one of the computed absolute data traffic load or the computed relative data traffic load over the third pre-selected period of time deviates from the corresponding expected absolute data traffic load or the expected relative data traffic load by a third pre-selected range; and providing, by the storage management computing device, a notification message of the detected deviation by the third pre-selected range.

5. The method of claim 1, further comprising:

computing, by the storage management computing device, an absolute data traffic load and a relative data traffic load between a group of associated network components over the fourth pre-selected range; and comparing, by the storage management computing device, the computed absolute data traffic load and the computed relative data traffic load over the fourth pre-selected period of time to an expected absolute data traffic load and an expected relative data traffic load between the group of associated network components;

detecting, by the storage management computing device, when at least one of the computed absolute data traffic load or the computed relative data traffic load over the fourth pre-selected period of time deviates from the corresponding expected absolute data traffic load or the expected relative data traffic load by a fourth pre-selected range; and providing, by the storage management computing device, a notification message of the detected deviation by the fourth pre-selected range.

6. The method as set forth in claim 1 further comprising:

storing, by the storage management computing device, the expected absolute data traffic load and the expected relative data traffic load between the first end node and second end node on the identified plurality of logical access paths in the network over the pre-selected period of time.

7. The method as set forth in claim 1 further comprising:

collecting and storing, by the storage management computing device, the current state configuration information and the current data traffic flow information from a plurality of sources in the network; and determining, by the storage management computing device, when the particular logical access path is configured for data flow using the current state configuration information.

8. The method of claim 7, wherein the collecting the current data traffic flow information further comprises collecting information associated with all data traffic loads for a plurality of host applications in the network.

9. A non-transitory computer readable medium having stored thereon instructions for analyzing data traffic loads associated with applications in a storage network comprising executable code which when executed by a processor, causes the processor to perform steps comprising:
- identifying a plurality of logical access paths propagating data between a first end node and a second end node in a network;
- computing absolute data traffic load comprising total data traffic load between the first end node and the second end node and relative data traffic load comprising data traffic between the first end node and the second end node relative to total data traffic load in the network, wherein the absolute data traffic load and the relative data traffic load are based on current state configuration information and current data traffic flow information of the identified plurality of logical access paths in the network over a pre-selected period of time;
- comparing the computed absolute data traffic load and the computed relative data traffic load over the pre-selected period of time to an expected absolute data traffic load and an expected relative data traffic load comprising a data traffic load relative to a total data traffic load, for each of the identified plurality of logical access paths in the network;
- detecting when at least one of the computed absolute data traffic load and the computed relative data traffic load associated with a particular logical access path deviates from the corresponding expected absolute data traffic load or the expected relative data traffic load by at least one pre-selected range, wherein the particular logical access path has no data flow during the at least one pre-selected period of time; and
- providing a notification message when a variance of the computed absolute data traffic load and the computed relative data traffic load associated with the identified plurality of logical access paths deviates from the corresponding expected data traffic loads by the at least one pre-selected range.

10. The non-transitory computer readable medium as set forth in claim 9 further having stored thereon instructions that when executed by the processor cause the processor to perform steps further comprising:
- standardizing formats of the current state configuration information, the current data traffic flow information and reconciling conflicts.

11. The non-transitory computer readable medium as set forth in claim 9 further having stored thereon instructions that when executed by the processor cause the processor to perform steps further comprising:
- computing the absolute data traffic load and the relative data traffic load through each port of a first network component over a second pre-selected period of time;
- comparing the computed absolute data traffic load and the computed relative data traffic load over the second pre-selected period of time to an expected absolute data traffic load and an expected relative data traffic load through each port of the first network component;
- detecting when at least one of the computed absolute data traffic load or the computed relative data traffic load over the second pre-selected period of time deviates from the corresponding expected absolute data traffic load or the expected relative data traffic load by a second pre-selected range; and
- providing a notification message of the detected deviation by the second pre-selected range.

12. The non-transitory computer readable medium as set forth in claim 9 further having stored thereon instructions that when executed by the processor cause the processor to perform steps further comprising:
- computing an absolute data traffic load and a relative data traffic load between the first network component and the second network component in the network over a third pre-selected period of time;
- comparing the computed absolute data traffic load and the computed relative data traffic load over the third pre-selected period of time to an expected absolute data traffic load and an expected relative data traffic load between the first network component and the second network component;
- detecting when at least one of the computed absolute data traffic load or the computed relative data traffic load over the third pre-selected period of time deviates from the corresponding expected absolute data traffic load or the expected relative data traffic load by a third pre-selected range; and
- providing a notification message of the detected deviation by the third pre-selected range.

13. The non-transitory computer readable medium as set forth in claim 9 further having stored thereon instructions that when executed by the processor cause the processor to perform steps further comprising:
- computing an absolute data traffic load and a relative data traffic load between a group of associated network components over the fourth pre-selected range; and
- comparing the computed absolute data traffic load and the computed relative data traffic load over the fourth pre-selected period of time to an expected absolute data traffic load and an expected relative data traffic load between the group of associated network components;
- detecting when at least one of the computed absolute data traffic load or the computed relative data traffic load over the fourth pre-selected period of time deviates from the corresponding expected absolute data traffic load or the expected relative data traffic load by a fourth pre-selected range; and
- providing a notification message of the detected deviation by the fourth pre-selected range.

14. The non-transitory computer readable medium as set forth in claim 9 further having stored thereon instructions that when executed by the processor cause the processor to perform steps further comprising:
- storing the expected absolute data traffic load and the expected relative data traffic load between the first end node and second end node on the identified plurality of logical access paths in the network over the pre-selected period of time.

15. The non-transitory computer readable medium as set forth in claim 9 further having stored thereon instructions that when executed by the processor cause the processor to perform steps further comprising:
- collecting and storing the current state configuration information and the current data traffic flow information from a plurality of sources in the network; and
- determining when the particular logical access path is configured for data flow using the current state configuration information.

16. The non-transitory computer readable medium as set forth in claim 15 wherein the collecting the current data traffic flow information further comprises collecting information associated with all data traffic loads for a plurality of host applications in the network.

17. A storage management computing device comprising:
a processor;
a memory coupled to the processor and configured to be capable of executing programmed instructions comprising and stored in the memory to:
identify a plurality of logical access paths propagating data between a first end node and a second end node in a network;
compute absolute data traffic load comprising total data traffic load between the first end node and the second end node and relative data traffic load comprising data traffic load between the first end node and the second end node relative to total data traffic load in the network, wherein the absolute data traffic load and the relative data traffic load are based on current state configuration information and current data traffic flow information of the identified plurality of logical access paths in the network over a pre-selected period of time;
compare the computed absolute data traffic load and the computed relative data traffic load over the pre-selected period of time to an expected absolute data traffic load and an expected relative data traffic load comprising a data traffic load relative to a total data traffic load, for each of the identified plurality of logical access paths in the network;
detect when at least one of the computed absolute data traffic load and the computed relative data traffic load associated with a particular logical access path deviates from the corresponding expected absolute data traffic load or the expected relative data traffic load by at least one pre-selected range, wherein the particular logical access path has no data flow during the at least one pre-selected period of time; and
provide a notification message when a variance of the computed absolute data traffic load and the computed relative data traffic load associated with the identified plurality of logical access paths deviates from the corresponding expected data traffic loads by the at least one pre-selected range.

18. The device as set forth in claim 17 wherein the processor is further configured to be capable of executing programmed instructions comprising and stored in the memory to:
standardize formats of the current state configuration information, the current data traffic flow information and reconciling conflicts.

19. The device as set forth in claim 17 wherein the processor is further configured to be capable of executing programmed instructions comprising and stored in the memory to:
compute the absolute data traffic load and the relative data traffic load through each port of a first network component over a second pre-selected period of time;
compare the computed absolute data traffic load and the computed relative data traffic load over the second pre-selected period of time to an expected absolute data traffic load and an expected relative data traffic load through each port of the first network component;
detect when at least one of the computed absolute data traffic load or the computed relative data traffic load over the second pre-selected period of time deviates from the corresponding expected absolute data traffic load or the expected relative data traffic load by a second pre-selected range; and
provide a notification message of the detected deviation by the second pre-selected range.

20. The device as set forth in claim 17 wherein the processor is further configured to be capable of executing programmed instructions comprising and stored in the memory to:
compute an absolute data traffic load and a relative data traffic load between the first network component and the second network component in the network over a third pre-selected period of time;
compare the computed absolute data traffic load and the computed relative data traffic load over the third pre-selected period of time to an expected absolute data traffic load and an expected relative data traffic load between the first network component and the second network component;
detect when at least one of the computed absolute data traffic load or the computed relative data traffic load over the third pre-selected period of time deviates from the corresponding expected absolute data traffic load or the expected relative data traffic load by a third pre-selected range; and
provide a notification message of the detected deviation by the third pre-selected range.

21. The device as set forth in claim 17 wherein the processor is further configured to be capable of executing programmed instructions comprising and stored in the memory to:
compute an absolute data traffic load and a relative data traffic load between a group of associated network components over the fourth pre-selected range; and
compare the computed absolute data traffic load and the computed relative data traffic load over the fourth pre-selected period of time to an expected absolute data traffic load and an expected relative data traffic load between the group of associated network components;
detect when at least one of the computed absolute data traffic load or the computed relative data traffic load over the fourth pre-selected period of time deviates from the corresponding expected absolute data traffic load or the expected relative data traffic load by a fourth pre-selected range; and
provide a notification message of the detected deviation by the fourth pre-selected range.

22. The device as set forth in claim 17 wherein the processor is further configured to be capable of executing programmed instructions comprising and stored in the memory to:
store the expected absolute data traffic load and the expected relative data traffic load between the first end node and second end node on the identified plurality of logical access paths in the network over the pre-selected period of time.

23. The device as set forth in claim 17 wherein the processor is further configured to be capable of executing programmed instructions comprising and stored in the memory to:
collect and store the current state configuration information and the current data traffic flow information from a plurality of sources in the network; and
determine when the particular logical access path is configured for data flow using the current state configuration information.

24. The device as set forth in claim 23 wherein the collecting the current data traffic flow information further comprises collecting information associated with all data traffic loads for a plurality of host applications in the network.

* * * * *